June 2, 1953  G. A. LYON  2,640,730
WHEEL COVER
Filed Sept. 14, 1948  2 Sheets-Sheet 1
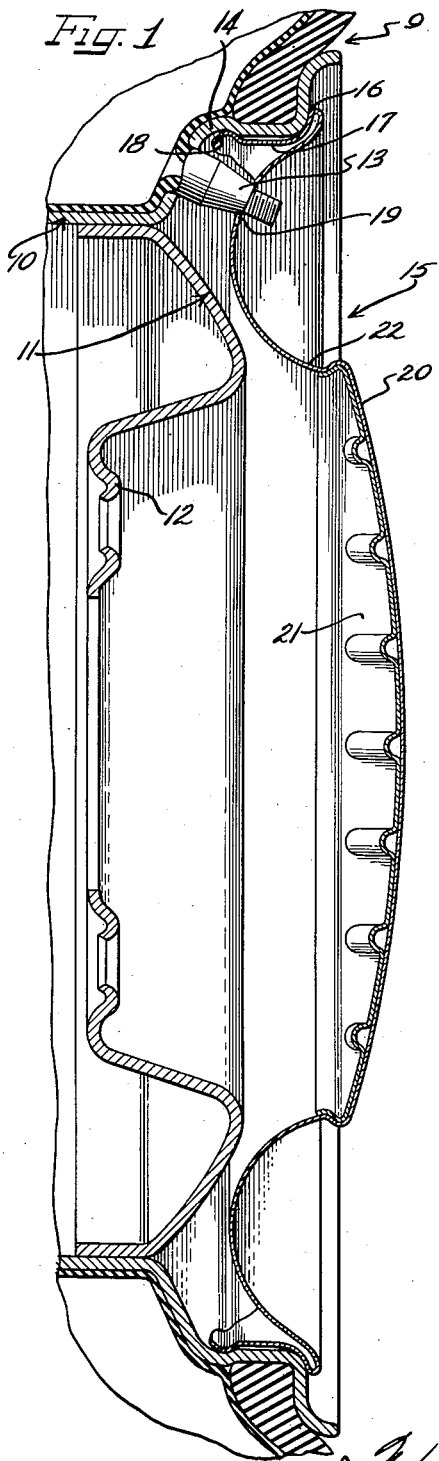
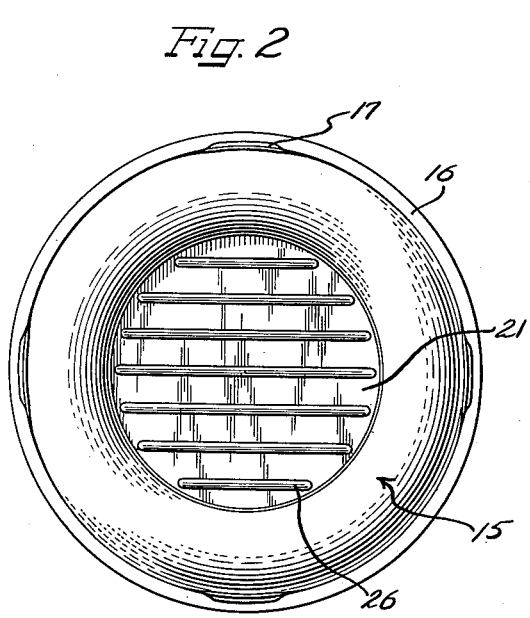
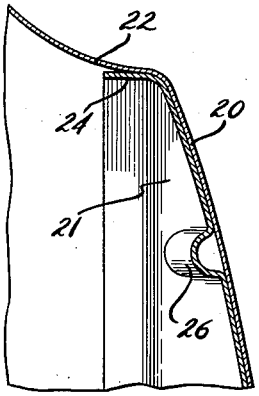
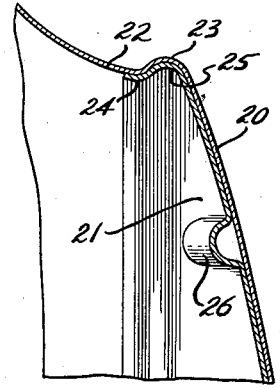
Inventor
George Albert Lyon June 2, 1953  G. A. LYON  2,640,730
WHEEL COVER
Filed Sept. 14, 1948  2 Sheets-Sheet 2
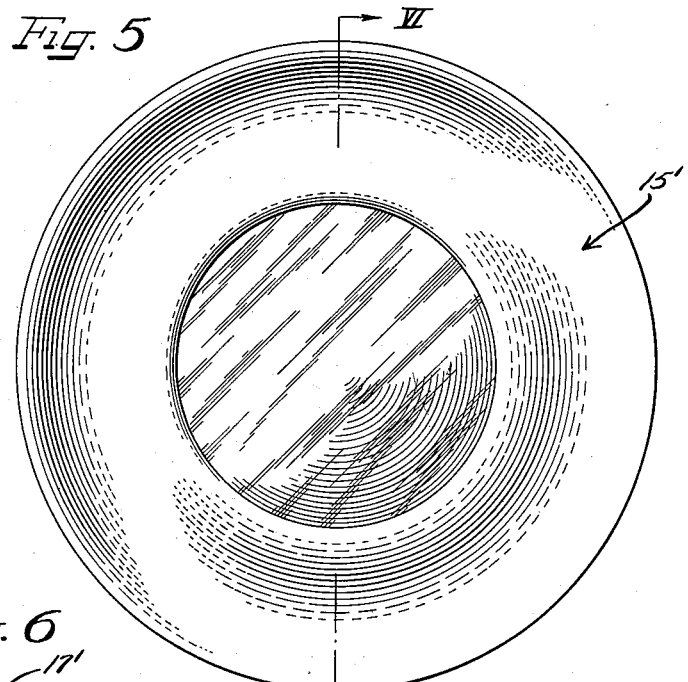
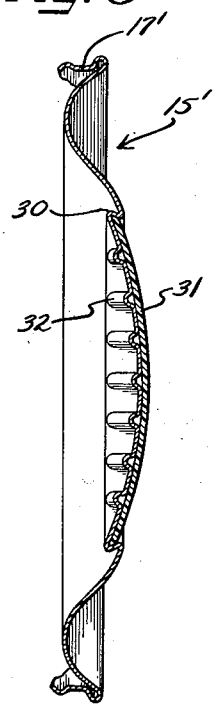
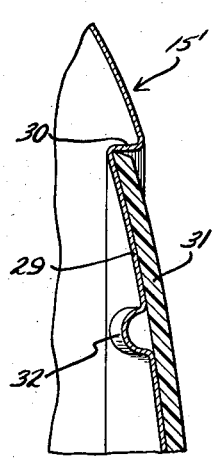
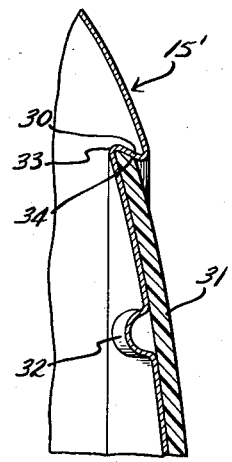
Inventor
George Albert Lyon
by  Attys Patented June 2, 1953

2,640,730

UNITED STATES PATENT OFFICE 2,640,730

WHEEL COVER

George Albert Lyon, Detroit, Mich.

Application September 14, 1948, Serial No. 49,238

3 Claims. (Cl. 301—37)

This invention relates to a wheel cover structure and more particularly to the reinforcing of the central or hub portion of the cover.

An object of this invention is to provide an improved and greater reinforced automobile wheel cover which, by reason of the reinforcement, can be otherwise made of relatively thin sheet metal.

Another object of this invention is to provide a wheel cover with central reinforcing means of such character that it can also be used as a backing for a reflector glass or the like at the center of the cover.

In accordance with the general features of this invention there is provided a wheel cover for an outer side of a wheel comprising a circular cover member having a central axially offset portion provided with a corrugated portion on the rear side of the cover for reinforcing the central portion against indentation.

Another feature of the invention relates to making the corrugated portion in the form of a plurality of crosswise corrugations projecting rearwardly from the central portion of the cover.

Still another feature of the invention relates to providing rigidifying corrugations in the center of the cover for backing up a reflector glass or the like at the hub of the cover.

Other objects and features of this invention will more fully appear from the following detailed description taken in connection with the accompanying drawings which illustrate several embodiments thereof, and in which:

Figure 1 is a fragmentary cross-sectional view through a wheel structure having applied thereto a cover of my invention;

Figure 2 is a rear view of the cover drawn on a reduced scale;

Figure 3 is a fragmentary sectional view of a central portion of the cover showing the arrangement of the reinforcing part prior to its being interlocked with the central portion of the cover;

Figure 4 is a sectional view similar to Figure 3 but showing the parts in central nested interlocking relationship;

Figure 5 is a front view of a modified form of cover;

Figure 6 is a cross-sectional view taken on line VI—VI of Figure 5;

Figure 7 is a fragmentary enlarged sectional view corresponding to the central portion of Figure 6 but showing the parts prior to their being interlocked; and Figure 8 is a fragmentary sectional view like Figure 7 but showing the central parts clinched together.

As shown on the drawings:

The reference character 9 designates a conventional pneumatic tire and tube assembly mounted on a multi-flanged drop center type of tire rim 10 carried in the usual way by a wheel body 11 having the customary central wheel bolt-on flange 12. The pneumatic assembly 9 includes the usual valve stem 13 projecting through a flange of tire rim 10. Also one of the axle flanges of the tire rim 10 has an annular depression at 14 which serves to assist in holding the bead or tire in place as is well known in the art.

The wheel or cap cover of my invention is designated generally by the reference character 15 and for the most part is made from a metallic stamping.

The outer edge of this cover is turned rearwardly into a beaded edge 16 for reinforcing the cover; and projecting rearwardly from this edge 16 are four equidistantly spaced resilient cover retaining fingers 17 each having a humped rear extremity adapted to be snapped into rim depression 14 for detachably retaining the cover on the wheel.

The four retaining fingers 17 may be made from the four corners of the blank from which the cover 15 is stamped thereby enabling the use of what otherwise would be scrap material for the formation of these fingers.

In addition the cover has an aperture 19 through which the valve stem 13 can project so as to be accessible.

In the application of the cover to the wheel, it is first placed over an outer side of the wheel with the hole 19 aligned with the stem 13. Thereafter, upon inward axial pressure on the cover the humped extremities 18 of the spring fingers are cammed along the rim flange until they snap into the depression 14, thereby retaining the cover on the wheel. In order to remove the cover, it is simply necessary to insert the edge of the pry-off tool under the cover edge 16 and thereby forcibly disengage the spring fingers from engagement with the depression 14.

Now a very important feature of this invention is concerned with the central or crowned portion 20 of the cover or cap 15. Obviously, this is the portion of the cover which is most apt to be damaged by impact in the use of the cover on the wheel. By reinforcing same, I am enabled to use thinner sheet metal in the cover, thereby cutting down the cost of the same.

In order to reinforce this crown portion 20 a cupped insert or stamping 21 is nested inside the axially offset crown portion 20 (Figure 3) with the marginal flange 24 in close proximity to the neck portion 22 at the center of the cover. Thereafter, this central structure of the cover is subjected to a press operation which collapses flange 24 radially outwardly at 25 and also collapses a portion 23 of the cover radially outwardly thereby tightly interlocking insert member 21 in nested relation with cover central crown portion 20. This provides an area of internesting convex panels at the center or crown of the cover.

It will be noted that the insert cup member 21 is provided with a plurality of transverse or crosswise rearwardly extending parallel corrugations 26 which assist in rigidifying the central portion of the assembled cover against permanent indentation. The corrugations or ribs 26 are preferably formed as a uniform pattern and running substantially to the periphery of the inner panel provided by the member 21. Because of the convex form of the inner panel, the corrugations or ribs 26 are arched and thus rendered of additional reenforcing value while nevertheless affording sufficient resiliency to resist substantial impact.

In Figure 5 I have illustrated a modified form of cover 15' which, as shown in Figure 6, has retaining fingers 17' like fingers 17. This cover is retained on the wheel in the same manner as the first described form. It differs from the first form in the construction of the central crown portion of the cover.

As best shown in Figure 7 the cover 15' at its central portion is inwardly offset as at 29 by means of an annular offset flange 30. On the offset portion 29 is seated a circular glass reflector 31 such as is commonly used on motor vehicles. In other words this reflector is made of a glass such as red glass which will in use reflect artificial light and thereby serve as a safety medium. It should also be noted that the glass member 31 provides a panel which is of a convex curved cross-sectional shape.

The central portion of the axially offset part 29 of the cover 15' is provided with a plurality of transverse cross-wise rearwardly projecting rigidifying corrugations 32 located directly behind the glass 31.

After the parts have been assembled in the manner as shown in Figure 7, the offsetting flange 30 is subjected to a press operation to collapse it radially inwardly at 33 around the periphery of glass 31 for interlocking the glass in the cover. To facilitate engagement of the reflector edge by the kicked in or collapsed flange 30, the edge is preferably beveled as at 34.

Now it is clear that in both forms the cover is provided with a centrally offset portion which in the case of Figure 1 is axially outwardly and in the case of Figure 6 is axially inwardly and that cross-wise corrugations are employed for rigidifying this central offset portion of the cover. In the form of Figure 1 the corrugations back up and reinforce the crown portion 20 of the cover, whereas in the form of Figure 6 the corrugations back up and reinforce the reflector member 31. While I have described the member 31 as being made of glass, it is, of course, within the province of this invention to make it of any other suitable artificial light reflecting material.

I claim as my invention:

1. As an article of manufacture, a wheel cover for an outer side of a vehicle wheel, the cover comprising a circular cover member having a central axially offset circular portion provided with a corrugated portion formed with a series of rib corrugations projecting axially inwardly and extending transversely parallel in a uniform grid-like pattern with the rib corrugations having their ends at substantially the periphery of the offset circular portion and being of graduated diminishing lengths to each side from the rib corrugation nearest the diameter of the circular portion, and the grid-like pattern of rib corrugations covering substantially the entire area of the corrugated portion on the rear side of the cover for reinforcing the central circular portion against indentations, said corrugated portion being convexly curved outwardly and said rib-like corrugations being arched conformably to the convex curvature with the arch radius of the rib corrugations being substantially diminishing proportionate to their lengths and distance from said diameter of the corrugated portion.

2. An article of manufacture as defined in claim 1 wherein the cover member has a substantial annular portion about said central axially offset circular portion and deeply dished inwardly relative to said central offset portion and provided at the outer margin of the dished annular portion with structure for retainingly engaging with a vehicle wheel.

3. An article of manufacture as defined in claim 1 wherein the central circular axially offset portion has an annular shoulder overhanging the corrugated portion, and a circular member complementary in shape to the convex curvature of the corrugated portion is seated upon the corrugated portion and has its margin retainingly engaged by said overhanging shoulder.

GEORGE ALBERT LYON.

References Cited in the file of this patent

UNITED STATES PATENTS

| Number | Name | Date |
|---|---|---|
| 1,407,177 | Stone | Feb. 21, 1922 |
| 2,326,788 | Lyon | Aug. 17, 1943 |
| 2,368,228 | Lyon | Jan. 30, 1945 |
| 2,405,390 | Lyon | Aug. 6, 1946 |